(12) United States Patent
McNeil

(10) Patent No.: US 11,029,327 B2
(45) Date of Patent: Jun. 8, 2021

(54) INERTIAL SENSOR WITH SUSPENSION SPRING STRUCTURE SURROUNDING ANCHOR

(71) Applicant: NXP USA, Inc., Austin, TX (US)

(72) Inventor: Andrew C. McNeil, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 274 days.

(21) Appl. No.: 16/176,256

(22) Filed: Oct. 31, 2018

(65) Prior Publication Data

US 2020/0132713 A1 Apr. 30, 2020

(51) Int. Cl.
*G01P 15/125* (2006.01)
*G01P 15/08* (2006.01)

(52) U.S. Cl.
CPC .... *G01P 15/125* (2013.01); *G01P 2015/0814* (2013.01); *G01P 2015/0828* (2013.01); *G01P 2015/0857* (2013.01)

(58) Field of Classification Search
CPC ...... G01P 2015/0811; G01P 2015/0814; G01P 2015/0808; G01P 15/125; G01P 2015/0805; B81B 2203/0163; B81B 2203/0172
See application file for complete search history.

(56) References Cited

U.S. PATENT DOCUMENTS

| 8,056,415 | B2 | 11/2011 | McNeil et al. | |
| 2005/0005698 | A1* | 1/2005 | McNeil | G01P 15/18 73/514.32 |
| 2009/0293617 | A1* | 12/2009 | McNeil | G01P 1/006 73/514.32 |
| 2016/0084872 | A1* | 3/2016 | Naumann | G01P 15/125 73/514.32 |
| 2019/0135613 | A1* | 5/2019 | Reinmuth | B81C 1/00166 |

FOREIGN PATENT DOCUMENTS

| DE | 102012104601 A1 * | 12/2012 | G01P 15/125 |
| WO | WO-2009145967 A1 * | 12/2009 | G01P 1/006 |

\* cited by examiner

*Primary Examiner* — Jill E Culler
*Assistant Examiner* — Ruben C Parco, Jr.
(74) *Attorney, Agent, or Firm* — Charlene R. Jacobsen

(57) ABSTRACT

An inertial sensor includes a substrate, a movable element having an edge, and a suspension system retaining the movable element in spaced apart relationship above a surface of the substrate. The suspension system includes an anchor attached to the surface of the substrate, the anchor having a first side laterally spaced apart from the edge of the movable element, and a spring structure having a first attach point coupled to the first side of the anchor and a second attach point coupled to the edge of the movable element. The spring structure includes beam sections serially adjoining one another, the beam sections extending from the first side of the anchor and surrounding the anchor to couple to the edge of the movable element. The spring structure makes no more than one coil around the anchor to position the first attach point in proximity to the second attach point.

12 Claims, 4 Drawing Sheets

PRIOR ART

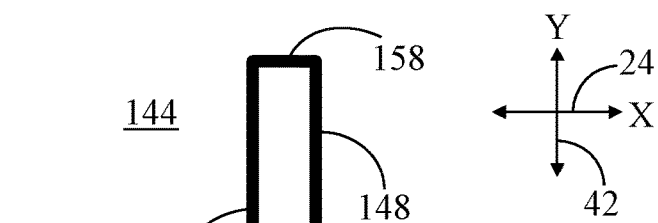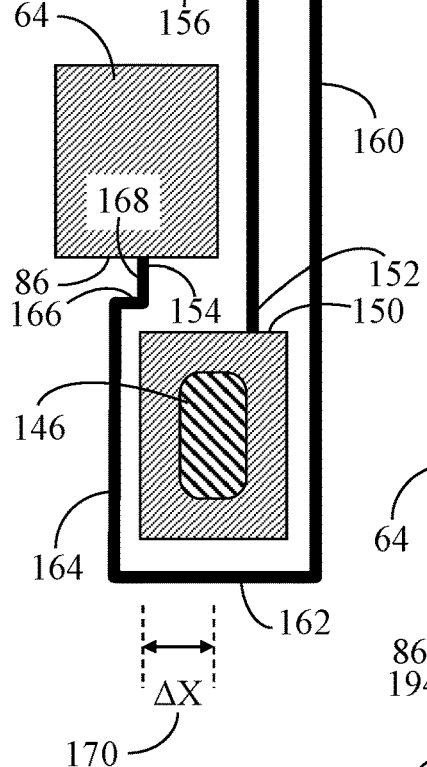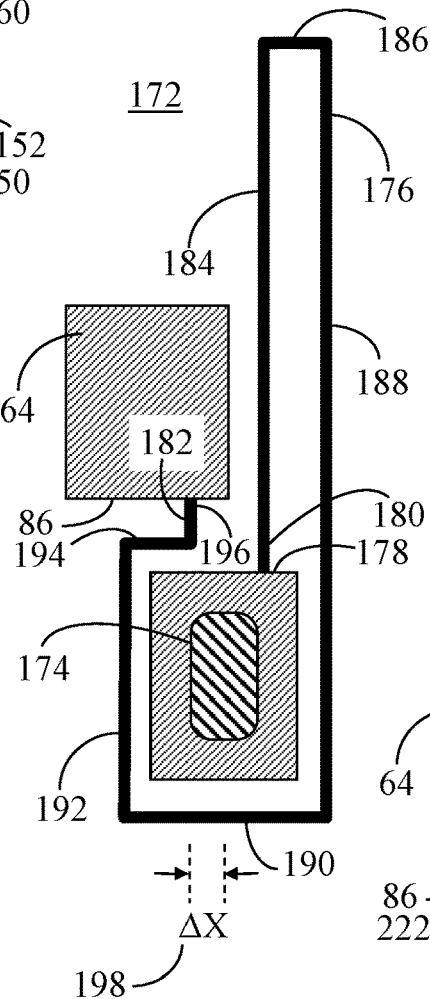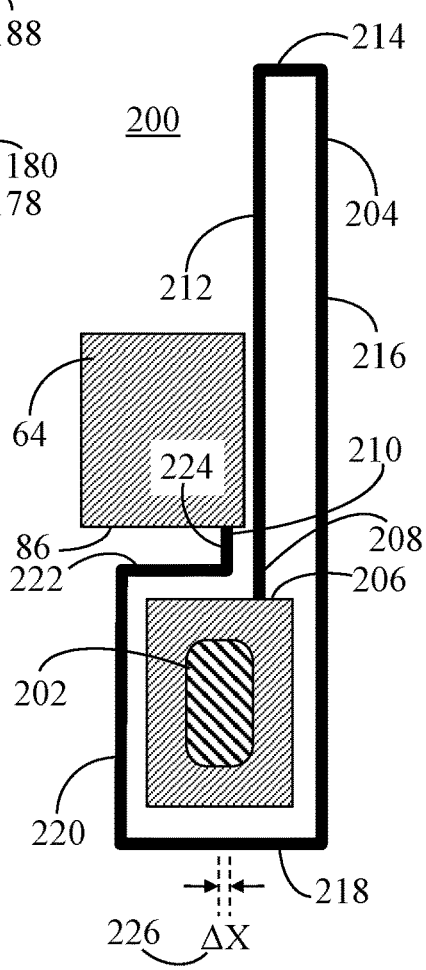

INERTIAL SENSOR WITH SUSPENSION SPRING STRUCTURE SURROUNDING ANCHOR

TECHNICAL FIELD OF THE INVENTION

The present invention relates generally to microelectromechanical systems (MEMS) devices. More specifically, the present invention relates to a MEMS inertial sensor with improved offset stability and compact size.

BACKGROUND OF THE INVENTION

Microelectromechanical systems (MEMS) technology provides a way to make very small mechanical structures and integrate these structures with electrical devices on a single substrate using conventional batch semiconductor processing techniques. One common application of MEMS is the design and manufacture of sensor devices. MEMS sensors are widely used in applications such as automotive, inertial guidance systems, household appliances, game devices, protection systems for a variety of devices, and many other industrial, scientific, and engineering systems.

One example of a MEMS inertial sensor is a MEMS accelerometer. A MEMS accelerometer uses one or more movable structures that move under acceleration above a substrate. The movement of the movable structure changes capacitance between the movable structure and fixed structures, and an electrical circuit connected to the MEMS accelerometer structure measures the change in capacitance to determine the acceleration forces. Capacitive-sensing MEMS designs are highly desirable for operation in high acceleration environments and in miniaturized devices, due to their relatively low cost.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

FIG. 7 shows a top view of a suspension system in accordance with another embodiment;

FIG. 8 shows a top view of a suspension system in accordance with another embodiment; and FIG. 9 shows a top view of a suspension system in accordance with another embodiment.

DETAILED DESCRIPTION

Embodiments of the present invention entail microelectromechanical systems (MEMS) inertial sensor devices with improved offset stability and compact device size. The MEMS inertial sensor devices can include transducers such as MEMS accelerometer devices. More particularly, embodiments described herein entail MEMS accelerometer devices capable of sensing acceleration along a single axis. The MEMS accelerometers can provide relatively compact device size by implementing suspension systems in which each suspension system includes a spring structure that surrounds its associated anchor and the spring structure interconnects the movable element with the anchor. Furthermore, embodiments described herein can provide this relatively small device size while reducing the effects of process variation on transducer output by suitably locating each anchor to improve offset stability and by placing opposing attach points of the spring structure in proximity to one another. Thus, such a differential capacitive inertial sensor may be less susceptible to offset error caused by, for example, thermally induced package stress gradients, thermal hysteresis, process variation, and so forth, and can be readily implemented as a low cost, compact, inertial sensor utilizing conventional manufacturing processes.

The instant disclosure is provided to further explain in an enabling fashion at least one embodiment in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of depositing, patterning, etching, and so forth. Accordingly, although different shading and/or hatching is utilized in the illustrations, the different elements within the structural layers may be formed out of the same material.

Figure 1:
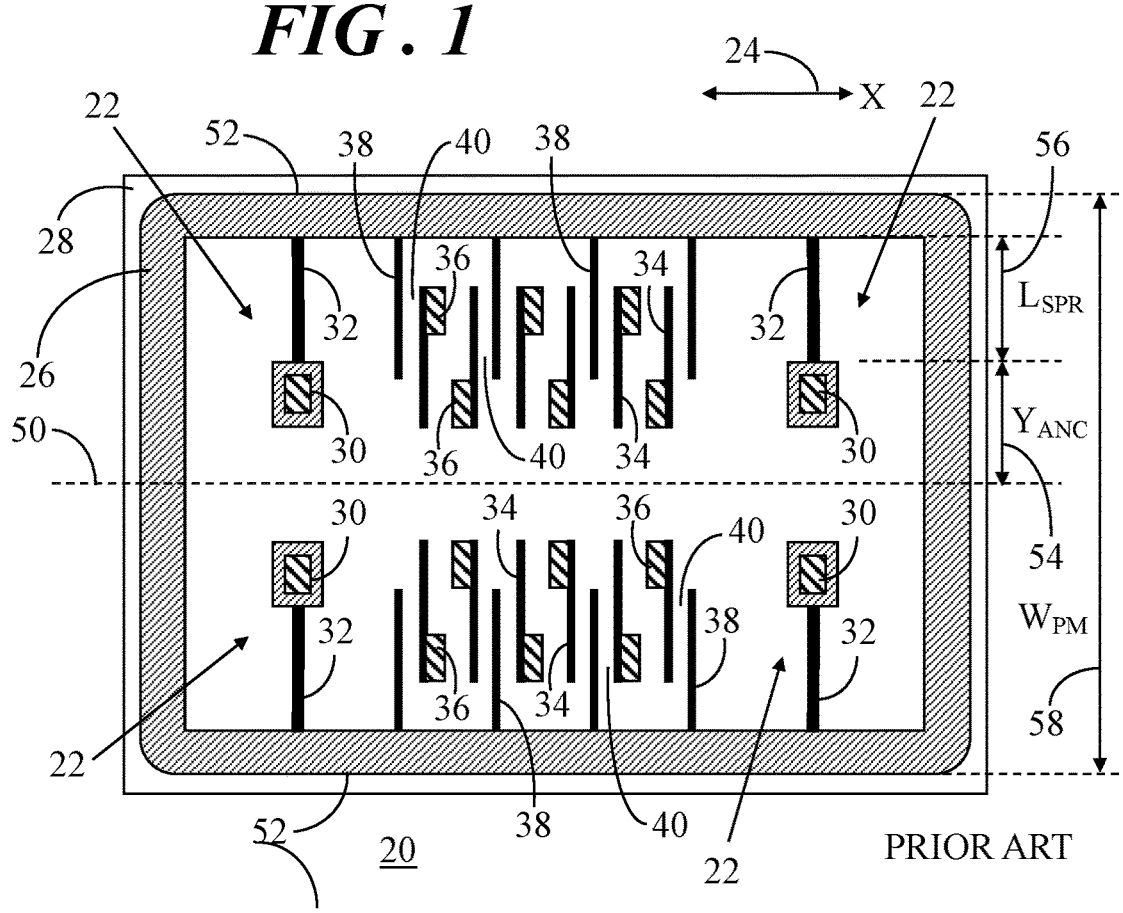
FIG. 1 shows a top view of a prior art capacitive inertial sensor.
Figure 2:
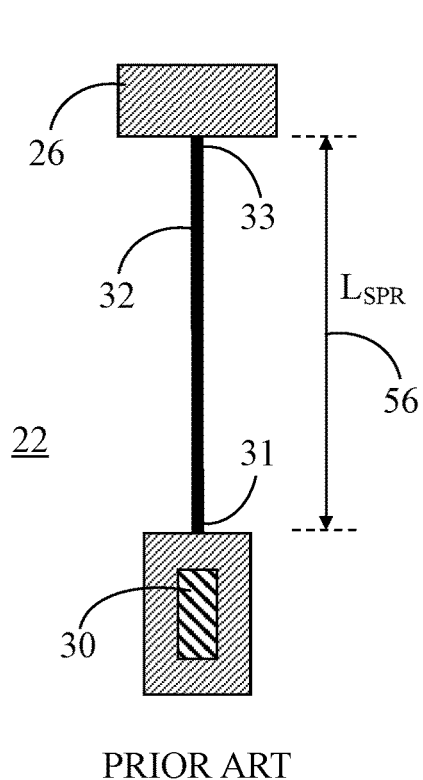
FIG. 2 shows a top view of a suspension system of the prior art capacitive inertial sensor.

Referring to FIGS. 1 and 2, FIG. 1 shows a top view of a prior art capacitive inertial sensor 20 and FIG. 2 shows a top view of a suspension system 22 of inertial sensor 20. Inertial sensor 20 is adapted to sense acceleration in an X-direction 24 (that is, acceleration parallel to a major planar surface of the device). As such, inertial sensor 20 is referred to hereinafter as accelerometer 20. Accelerometer 20 includes a movable element 26, sometimes referred to as a proof mass or shuttle, suspended above an underlying substrate 28 by multiple suspension systems 22. Each of suspension systems 22 includes a suspension anchor 30 formed on substrate 26 and a spring structure 32 interconnecting movable element 26 with a corresponding suspension anchor 30. For example, a first attach point 31 of spring structure 32 is coupled to anchor 30 and a second attach point 33 of spring structure 32 is coupled to movable element 32. Accordingly, in this example, four suspension systems 22 retain movable element 26 spaced apart from substrate 28.

Pairs of fixed fingers 34 are attached to substrate 26 by fixed finger anchors 36. Sense fingers 38 extending from movable element 26 are positioned adjacent to fixed fingers 34. Sense gaps 40 are thus formed between sense fingers 38 and corresponding fixed fingers 34. In a structure of this type, when movable element 26 moves in response to acceleration in X-direction 24, capacitances between the moving sense fingers 38 and the fixed fingers 34 change. MEMS accelerometer 20 is provided with electronic circuitry (not shown) which converts these capacitive changes to signals representative of acceleration in X-direction 24.

Lateral sense motion MEMS sensor designs can suffer from poor offset stability. That is, a MEMS sensor is expected to output a signal that is proportional to the applied force on it, e.g., acceleration. Offset error can result in a shift between the quantity of interest and the quantity being reported, thus adversely affecting the output of capacitive accelerometer 20. Offset stability can be affected by the Temperature Coefficient of Offset (TCO) and thermal hysteresis. Offset stability can additionally or alternatively be affected by the nominal design of the MEMS sensor, as well as by process variation of the MEMS sensor away from the nominal design.

TCO is a measure of how much thermal stresses effect the performance of a semiconductor device, such as a MEMS sensor. A high TCO indicates correspondingly high thermally induced stress, or a MEMS device that is very sensitive to such a stress. The packaging of MEMS sensor applications often uses materials with dissimilar coefficients of thermal expansion. Thus, an undesirably high TCO may develop during manufacture or operation. In addition, stresses can result from soldering the packaged semiconductor device onto a printed circuit board in an end application. These stresses can result in the deformation of the underlying substrate, typically referred to as package stress. Deformation of the substrate can result in displacements of suspension anchors and fixed finger anchors, and these displacements can cause changes in the sense capacitances, thus adversely affecting the output of a capacitive accelerometer. Thermal hysteresis can result in the inability of the movable element to return to a null position, thereby also adversely affecting the output of the capacitive accelerometer.

Process variations can affect the formation of the MEMS devices such that variances can occur among identical MEMS devices within a wafer and/or variances can occur within a single MEMS device. In MEMS capacitive devices, changes in the sense capacitances (e.g., offset error) of the output signal can occur due to process variation, which may limit MEMS device yield or which may require large capacitance variability tolerances and thereby limit the usefulness of such MEMS devices. To compensate for the process variations, MEMS capacitive devices may be screened and partitioned based upon their off/on capacitance. MEMS capacitive devices with poor tolerance may be scrapped which significantly reduces overall wafer yield.

Figure 3:
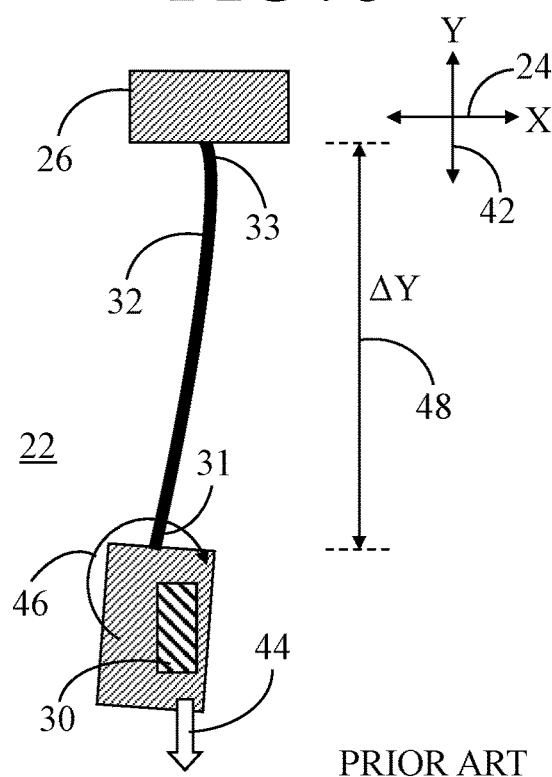
FIG. 3 shows a top view of the suspension system undergoing deformation due to process variation.

Referring now to FIG. 3, FIG. 3 shows a top view of one of suspension systems 22 undergoing deformation due to process variation. In this example, suspension anchor 30 is misaligned in X-direction 24. In particular, axial package deformation in a Y-direction 42, represented by a downward directed arrow 44 creates a moment (represented by a curved arrow 46) such that suspension anchor 30 rotates. The symbol "ΔY" represents a distance 48 between opposing attach points 31, 33 of spring structure 32 in Y-direction 42. A potential displacement of movable element 26 in the sense direction (e.g., X-direction 24) is a function of the amount of anchor rotation in combination with distance 48 between attach points 31, 33 of spring structure 32. This displacement of movable element 26 in the sense direction (e.g., X-direction 24) can adversely affect the offset stability of accelerometer 20 thereby decreasing its accuracy. Further, deformation in Y-direction 42 may be large and can change with package temperature, thus creating TCO (e.g., offset error).

Referring back to FIG. 1, in addition to offset stability, many MEMS sensor applications require smaller size and low cost packaging to meet aggressive cost targets. For some designs, the size of the MEMS device is determined by the size of the suspension system. To have a suitably low TCO, the suspension anchors (e.g., suspension anchors 30) should be placed at some point between a centerline 50 and an outer edge 52 of movable element 26, as represented by an arrow 54, labeled $Y_{ANC}$. A symbol "$L_{SPR}$" shown in FIGS. 1 and 2 represents a nominal design length 56 for spring structure 32 to achieve a desired spring constant for spring structure 32. Accordingly, a total width 58 of movable element 26, $W_{PM}$, can be represented, as follows:

$$W_{PM} > 2(L_{SPR} + Y_{ANC}) \qquad (1)$$

In equation (1), $W_{PM}$ represents total width 58 of movable element 26 (e.g., a proof mass), $L_{SPR}$ represents nominal design length 56 of spring structure 32 to achieve a desired spring constant, and $Y_{ANC}$ represents the displacement 54 of suspension anchor 30 away from centerline 50. Total width 56 must be at least twice the sum of $L_{SPR}$ and $Y_{ANC}$ due to the configuration of four suspension systems 22 implemented in MEMS accelerometer 22. As such, it can be observed that the size of suspension systems 22 can determine a minimum size of movable element 26.

Accordingly, embodiments described below entail designs for a lateral spring structure of a MEMS inertial sensor that can provide improved offset stability as well as achieve a compact size of MEMS inertial sensor.

Figure 4:
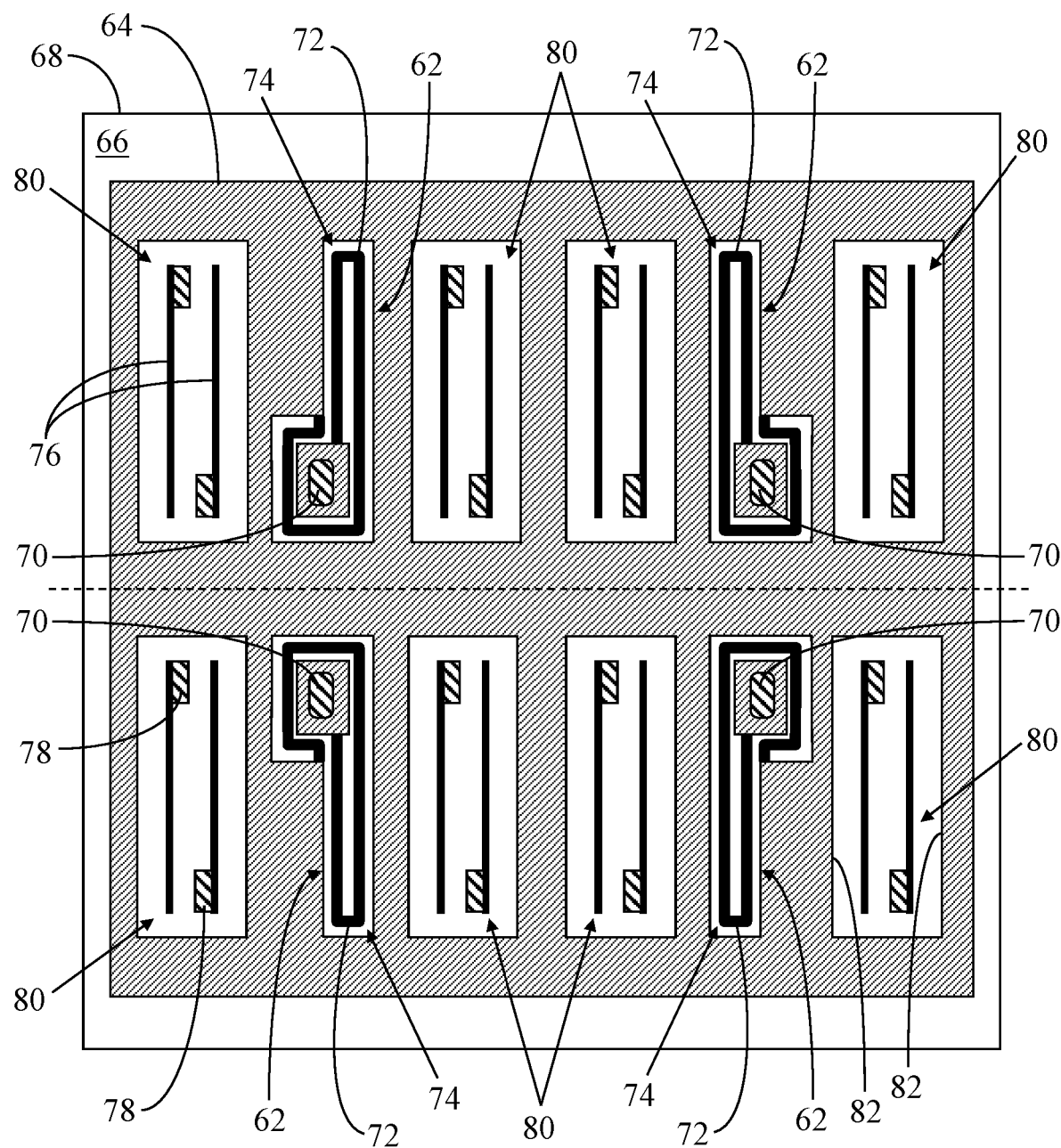
FIG. 4 shows a top view of a microelectromechanical systems (MEMS) inertial sensor in accordance with an embodiment.
Figure 5:
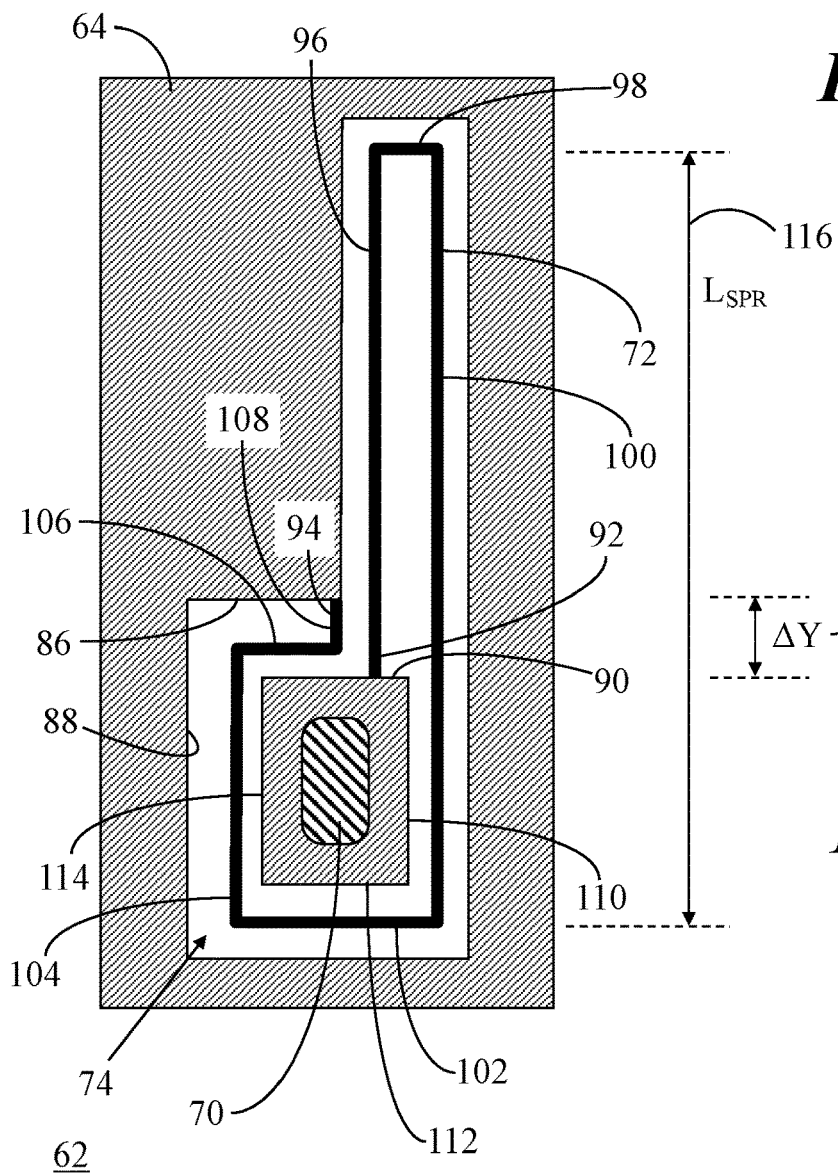
FIG. 5 shows a top view of a suspension system of the MEMS inertial sensor of FIG. 4.

Referring now to FIGS. 4 and 5, FIG. 4 shows a top view of a microelectromechanical systems (MEMS) inertial sensor 60 in accordance with an embodiment and FIG. 5 shows a top view of a suspension system 62 that may be implemented in MEMS inertial sensor 60. In the illustrated example, inertial sensor 60 is adapted to sense acceleration in X-direction 24. As such, inertial sensor 60 is referred to hereinafter as accelerometer 60. Accelerometer 60 includes a movable element 64 that is retained in spaced apart relationship above a surface 66 of an underlying substrate 68 by multiple suspension systems 62. Each of suspension systems 62 includes an anchor 70 and a spring structure 72. In some embodiments, multiple openings 74 extend through movable element 64, one each of suspension systems 62 residing in one each of multiple openings 74. Accordingly, spring structure 72 of each of suspension systems 62 enables sense motion of movable element 64 in X-direction 24 parallel to surface 66 of substrate 68, the sensing motion being responsive to acceleration in X-direction 24.

Pairs of fixed fingers 76 are attached to surface 66 of substrate 68 by fixed finger anchors 78. Additional openings 80 may extend through movable element 64 in which pairs of fixed fingers 76 reside. Edges 82 of openings 80 that are adjacent to fixed fingers 76 function as sense elements or "fingers" of movable element 64. As such, sense gaps 84 are formed between edges 82 and corresponding fixed fingers 76. When movable element 64 moves in response to acceleration in X-direction 24, capacitances between the moving edges 82 of movable element 64 and fixed fingers 76 change. These capacitive changes can be converted to signals representative of acceleration in X-direction 24.

As best seen in FIG. 5, movable element 64 has an edge 86 at an inner perimeter 88 of opening 80. Anchor 70 has a first side 90 laterally spaced apart from edge 86. In some embodiments, edge 86 of movable element 64 is oriented parallel to and facing first side 90 of anchor 70. Spring structure 72 has a first attach point 92 coupled to first side 90 of anchor 70 and a second attach point 94 coupled to edge 86 of movable element 64. Spring structure 72 has a plurality of beam sections 96, 98, 100, 102, 104, 106, 108 serially adjoining one another. Beam sections 96, 98, 100, 102, 104, 106, 108 extend from first side 90 of anchor 70 and surround anchor 70 to couple to edge 86 of movable element 64. Spring structure 72 makes no more than one coil or loop around anchor 70 to position first attach point 92 of spring structure 72 in proximity to second attach point 94 of spring structure 72.

In the illustrated embodiment, a first beam section 96 has first attach point 92 coupled to first side 90 of anchor 70 and second beam section 98 is coupled to first beam section 96. Third beam section 100 is coupled to second beam section 98 and is arranged parallel to first beam section 96. Third beam section 100 additionally resides adjacent to a second side 110 of anchor 70. Fourth beam section 102 is coupled to beam section 100 and resides adjacent to a third side 112 of anchor 70, and fifth beam section 104 is coupled to fourth beam section 102 and resides adjacent to a fourth side 114 of anchor 70. Further, sixth beam section 106 is coupled to fifth beam section 104 and seventh beam section 108 is coupled to sixth beam section 106 to form the single coil around anchor 70. Seventh beam section 108 has second attach point 94 of spring structure 72 coupled to edge 86 of opening 74 extending through movable element 64.

The configuration of the serially adjoined beam sections 96, 98, 100, 102, 104, 106, 108 surrounding anchor 70 effectively reduces the space used by spring structure 72 relative to spring 32 (FIG. 2). As such, MEMS inertial sensor 60 may achieve a more compact device size than, for example, inertial sensor 20 (FIG. 2). Third beam section 100 is characterized by a length 116, $L_{SPR}$, that is greater than a discrete, or individual, length of each of the remaining beam sections 96, 98, 102, 104, 106, 108. Further, length 116 of third beam section 100 is oriented in Y-direction 42 to enable sense motion of movable element 64 in response to acceleration in X-direction 24. In general, the spring constant of a spring structure, e.g., spring structure 72 is largely determined by the length of the longest beam section. Thus, length 116 of third beam section 100 determines the spring constant of spring structure 72. Accordingly, the configuration of the serially adjoined beam sections 96, 98, 100, 102, 104, 106, 108 surrounding anchor 70 additionally yields the same or a similar spring constant as inertial sensor 20 in the reduced space in Y-direction 42 resulting from the wrap around beam sections of spring structure 72.

The configuration of the serially adjoined beam sections 96, 98, 100, 102, 104, 106, 108 results in first and second attach points 92, 94 being displaced away from one another in Y-direction 42 perpendicular to X-direction 24 and parallel to surface 66 of substrate 68. In some embodiments, first and second attach points 92, 94 are aligned with one another in Y-direction 42. That is, there is no offset (e.g., ΔX=0) of first and second attach points 92, 94 in X-direction 24 in some embodiments. Additionally, a distance 118, ΔY, between first and second attach points 92, 94 is significantly less than distance 48, ΔY, between first and second attach points 92, 94 of spring structure 32 (FIG. 3). A minimal distance 118 between first and second attach points may decrease the effect of anchor rotation (e.g., moment 46, FIG. 3) due to process variation and/or package stress to improve offset stability and thereby enhance sensor accuracy.

Figure 6:
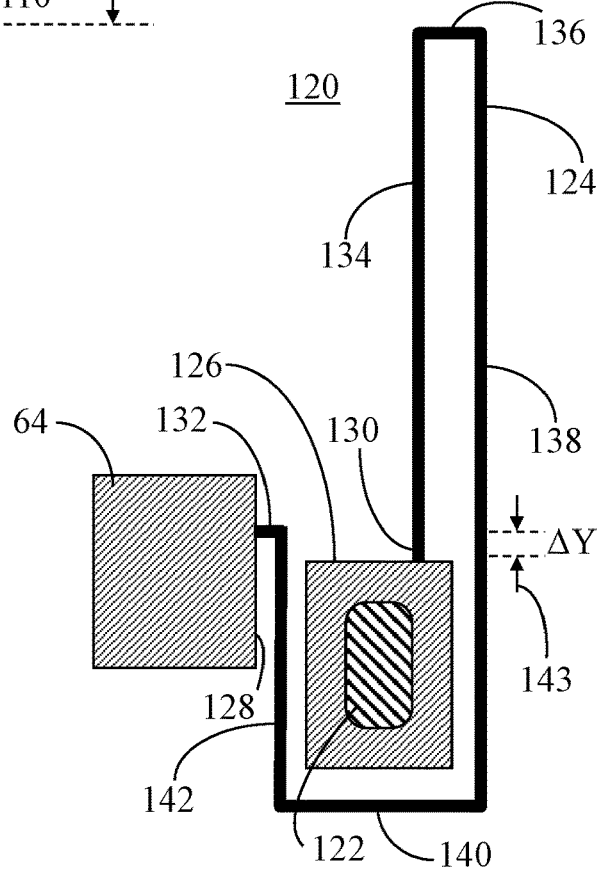
FIG. 6 shows a top view of a suspension system in accordance with another embodiment.

Referring now to FIG. 6, FIG. 6 shows a top view of a suspension system 120 in accordance with another embodiment. Multiple suspension systems 120 may be implemented within MEMS inertial sensor 60 (FIG. 4) in lieu of suspension systems 62 (FIG. 4). Suspension system 120 includes an anchor 122 and a spring structure 124. Anchor 122 has a first side 126, and in this example embodiment, movable element 64 has an edge 128 that is oriented perpendicular to first side 126 of anchor 122. Spring structure 124 has a first attach point 130 coupled to first side 126 of anchor 122 and a second attach point 132 coupled to edge 128 of movable element 64.

In addition, spring structure 124 further has a plurality of beam sections 134, 136, 138, 140, 142 serially adjoining one another. Beam sections 134, 136, 138, 140, 142 extend from first side 126 of anchor 122 and surround anchor 122 to couple to edge 128 of movable element 64. Again, spring structure 124 makes no more than one coil or loop around anchor 122 to position first attach point 130 of spring structure 124 in proximity to second attach point 132 of spring structure 124. However, in this example, first and second attach points 130, 132 are offset, or displaced, from one another in X-direction 24. Nevertheless, a distance 143, ΔY, between first and second attach points 130, 132 of spring structure 124 is again minimized to decrease the effect of anchor rotation (e.g., moment 46, FIG. 3) due to process variation and/or package stress to improve offset stability and thereby enhance sensor accuracy. Further, the configuration of the serially adjoined beam sections 134, 136, 138, 140, 142 surrounding anchor 122 may effectively reduce the space used by spring structure 122 relative to spring 32 (FIG. 2) while providing the same or a similar spring constant as inertial sensor 20. Additionally, the configuration of the serially adjoined beam sections 134, 136, 138, 140, 142 surrounding anchor 122 may simplify the construction of spring structure 124 and/or the shape of openings 74 (FIG. 4) relative to spring structure 62 (FIG. 4).

In FIGS. 5 and 6, as well as in subsequent FIGS. 7-9, the suspension anchors are shown in a relatively centered configuration within the material structural layers (represented by upward and rightward directed narrow hatching) surrounding the anchors. It should be understood, however, that process variability may result in the anchors being off-centered, thereby potentially creating moment 46 (FIG. 3).

FIG. 7 shows a top view of a suspension system 144 in accordance with another embodiment. FIG. 7 and subsequent FIGS. 8 and 9 provide examples of variations in the locations of the attach points that may be implemented to obtain an optimum offset error. An optimum offset error will create a zero moment about the spring structure when the anchor is displaced in Y-direction resulting in zero displacement of the movable element in response to thermal effects and/or process variation. Any of the suspension systems illustrated in FIGS. 7-8 may be utilized within MEMS inertial sensor 60 (FIG. 4) in lieu of suspension systems 62 (FIG. 4).

Suspension system 144 includes an anchor 146 and a spring structure 148. Anchor 146 has a first side 150 facing edge 86 of movable element 64. In this example, edge 86 of movable element 64 is oriented parallel to and facing first side 150 of anchor 146. Spring structure 148 has a first attach point 152 coupled to first side 150 of anchor 146 and a second attach point 154 coupled to edge 86 of movable element 64. Spring structure 124 again has a plurality of beam sections 156, 158, 160, 162, 164, 166, 168 serially adjoining one another. Beam sections 156, 158, 160, 162, 164, 166, 168 extend from first side 150 of anchor 146 and surround anchor 146 to couple to edge 86 of movable element 64. Again, spring structure 148 makes no more than one coil or loop around anchor 146 to position first attach point 152 of spring structure 148 in proximity to second attach point 154 of spring structure 148.

Like suspension system 62 (FIG. 5), first and second attach points 152, 154 are displaced away from one another in Y-direction 42 perpendicular to X-direction 24. However, first and second attach points 152, 154 are offset from one another in X-direction 24. An offset 170 is represented in FIG. 7 by ΔX. As shown, second attach point 154 is offset in a negative X-direction 24 (e.g., leftward in FIG. 7) relative to first attach point 152. Therefore, offset 170 is not equal to zero (e.g., ΔX≠0).

FIG. 8 shows a top view of a suspension system 172 in accordance with another embodiment. Suspension system 172 includes an anchor 174 and a spring structure 176. Anchor 174 has a first side 178 facing edge 86 of movable element 64. In this example, edge 86 of movable element 64 is again oriented parallel to and facing first side 178 of anchor 174. Spring structure 176 has a first attach point 180 coupled to first side 178 of anchor 174 and a second attach point 182 coupled to edge 86 of movable element 64. Spring structure 176 again has a plurality of beam sections 184, 186, 188, 190, 194, 196 serially adjoining one another and making no more than one coil or loop around anchor 174 to position first attach point 180 of spring structure 176 in proximity to second attach point 182 of spring structure 176.

First and second attach points 180, 182 are displaced away from one another in Y-direction 42 perpendicular to X-direction 24. However, first and second attach points 152, 154 are also offset from one another in X-direction 24. An offset 198 is represented in FIG. 8 by ΔX. As shown, second attach point 182 is offset in a negative X-direction 24 (e.g., leftward in FIG. 8) relative to first attach point 180. Therefore, offset 198 is not equal to zero (e.g., ΔX≠0). However, offset 198 is smaller than offset 170 (FIG. 7).

FIG. 9 shows a top view of a suspension system 200 in accordance with another embodiment. Suspension system 200 includes an anchor 202 and a spring structure 204. Anchor 202 has a first side 206 facing edge 86 of movable element 64. In this example, edge 86 of movable element 64 is again oriented parallel to and facing first side 206 of anchor 202. Spring structure 204 has a first attach point 208 coupled to first side 206 of anchor 202 and a second attach point 210 coupled to edge 86 of movable element 64. Spring structure 204 again has a plurality of beam sections 212, 214, 216, 218, 220, 222, 224 serially adjoining one another and making no more than one coil or loop around anchor 202 to position first attach point 208 of spring structure 204 in proximity to second attach point 210 of spring structure 204.

First and second attach points 208, 210 are displaced away from one another in Y-direction 42 perpendicular to X-direction 24. Additionally, first and second attach points 208, 210 are offset from one another in X-direction 24. An offset 226 is represented in FIG. 9 by ΔX. As shown, second attach point 210 is offset in a positive X-direction 24 (e.g., rightward in FIG. 9) relative to first attach point 208. Therefore, offset 226 is not equal to zero (e.g., ΔX≠0).

Various embodiments of spring structure for suspension systems of a single axis MEMS inertial sensor have been described herein in connection with FIGS. 5-9. Those of skill in the art would understand, based on the description herein, that alternative spring structures surrounding their corresponding anchors may have differing configurations then those shown.

Embodiments disclosed herein entail MEMS inertial sensor devices, such as MEMS single axis accelerometers, with improved offset stability and compact device size. An embodiment of inertial sensor comprises a substrate, a movable element having an edge, and a suspension system retaining the movable element in spaced apart relationship above a surface of the substrate. The suspension system includes an anchor attached to the surface of the substrate, the anchor having a first side laterally spaced apart from the edge of the movable element, and a spring structure having a first attach point coupled to the first side of the anchor and a second attach point coupled to the edge of the movable element. The spring structure includes beam sections serially adjoining one another, the beam sections extending from the first side of the anchor and surrounding the anchor to couple to the edge of the movable element, wherein the spring structure makes no more than one coil around the anchor to position the first attach point in proximity to the second attach point.

Another embodiment of an inertial sensor comprises a substrate, a movable element having an edge, and an opening extending through the movable element, wherein the edge is at an inner perimeter of the opening, and a suspension system residing in the opening, the suspension system retaining the movable element in spaced apart relationship above a surface of the substrate. The suspension system includes an anchor attached to the surface of the substrate, the anchor having a first side laterally spaced apart from the edge of the movable element, and a spring structure having a first attach point coupled to the first side of the anchor and a second attach point coupled to the edge of the movable element, the spring structure including beam sections serially adjoining one another, the beam sections extending from the first side of the anchor and surrounding the anchor to couple to the edge of the movable element, wherein the spring structure makes no more than one coil around the anchor to position the first attach point in proximity to the second attach point. The beam sections of the spring structure include a first beam section having the first attach point coupled to the first side of the anchor, a second beam section coupled to the first beam section, a third beam section coupled to the second beam section and arranged substantially parallel to the first beam section, the third beam section residing adjacent to a second side of the anchor, a fourth beam section coupled to the third beam section and residing adjacent to a third side of the anchor, and a fifth beam section coupled to the fourth beam section and residing adjacent to a fourth side of the anchor.

Another embodiment of an inertial sensor comprises a substrate, a movable element having an edge, and a suspension system retaining the movable element in spaced apart relationship above a surface of the substrate. The suspension system includes an anchor attached to the surface of the substrate, the anchor having a first side laterally spaced apart from the edge of the movable element, the edge of the movable element being oriented parallel to and spaced apart from the first side of the anchor by a gap, and a spring structure having a first attach point coupled to the first side of the anchor and a second attach point coupled to the edge of the movable element. The spring structure includes beam sections serially adjoining one another, the beam sections extending from the first side of the anchor and surrounding the anchor to couple to the edge of the movable element, wherein the spring structure makes no more than one coil around the anchor to position the first attach point in proximity to the second attach point. The spring structure enables sense motion of the movable element in a first direction parallel to the surface of the substrate, and the first and second attach points are displaced away from one another in a second direction perpendicular to the first direction and parallel to the surface of the substrate.

Thus, embodiments described herein can provide relatively compact device size by implementing suspension systems in which each suspension system includes a spring structure that surrounds its associated anchor and the spring structure interconnects the movable element with the anchor. Furthermore, embodiments described herein can provide this relatively small device size while reducing the effects of process variation on transducer output by suitably locating each anchor to improve offset stability and by placing opposing attach points of the spring structure in proximity to one another. Thus, such a differential capacitive inertial sensor may be less susceptible to offset error caused by, for example, thermally induced package stress gradients, thermal hysteresis, process variation, and so forth, and can be readily implemented as a low cost, compact, inertial sensor utilizing conventional manufacturing processes.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An inertial sensor comprising:
    a substrate;
    a movable element having an edge; and
    a suspension system retaining the movable element in spaced apart relationship above a surface of the substrate, the suspension system including:
        an anchor attached to the surface of the substrate, the anchor having first, second, third, and fourth sides, the first side being laterally spaced apart from the edge of the movable element; and
        a spring structure having a first attach point coupled to the first side of the anchor and a second attach point coupled to the edge of the movable element, the spring structure including beam sections serially adjoining one another, the beam sections extending from the first side of the anchor and surrounding the first, second, third, and fourth sides of the anchor to couple to the edge of the movable element, wherein the spring structure makes no more than one coil around the anchor to position the first attach point in proximity to the second attach point, and wherein the beam sections of the spring structure include:
        a first beam section having the first attach point coupled to the first side of the anchor;
        a second beam section coupled to the first beam section;
        a third beam section coupled to the second beam section and arranged substantially parallel to the first beam section, the third beam section residing adjacent to the second side of the anchor;
        a fourth beam section coupled to the third beam section and residing adjacent to the third side of the anchor; and
        a fifth beam section coupled to the fourth beam section and residing adjacent to the fourth side of the anchor, wherein the third beam section is characterized by a length that is greater than a discrete length of each of the first, second, fourth, and fifth beam sections, the length of the third beam section determining a spring constant of the spring structure.

2. The inertial sensor of claim 1 wherein the edge of the movable element is oriented parallel to and facing the first side of the anchor.

3. The inertial sensor of claim 1 wherein the spring structure enables sense motion of the movable element in a first direction parallel to the surface of the substrate, and the first and second attach points are displaced away from one another in a second direction perpendicular to the first direction and parallel to the surface of the substrate.

4. The inertial sensor of claim 3 wherein the first and second attach points are offset from one another in the first direction.

5. The inertial sensor of claim 1 wherein the spring structure enables sense motion of the movable element in a first direction parallel to the surface of the substrate, the edge of the movable element is oriented perpendicular to the first side of the anchor, and the first attach point is displaced away from the second attach point in the first direction.

6. The inertial sensor of claim 1 wherein the spring structure enables sense motion of the movable element in a first direction parallel to the surface of the substrate, and a length of the third beam section is oriented in a second direction parallel to the surface of the substrate and perpendicular to the first direction.

7. The inertial sensor of claim 1 wherein an opening extends through the movable element, the edge of the movable element is at an inner perimeter of the opening, and the anchor and spring structure reside in the opening.

8. The inertial sensor of claim 1 wherein the suspension system is one of multiple suspension systems retaining the movable element in spaced apart relationship above the surface of the substrate, and one each of the multiple suspension systems resides in one each of multiple openings extending through the movable element.

9. An inertial sensor comprising:
    a substrate;
    a movable element having an edge, and an opening extending through the movable element, wherein the edge is at an inner perimeter of the opening; and
    a suspension system residing in the opening, the suspension system retaining the movable element in spaced apart relationship above a surface of the substrate, the suspension system including:
        an anchor attached to the surface of the substrate, the anchor having first, second, third, and fourth sides, the first side being laterally spaced apart from the edge of the movable element; and
        a spring structure having a first attach point coupled to the first side of the anchor and a second attach point coupled to the edge of the movable element, the spring structure including beam sections serially adjoining one another, the beam sections extending from the first side of the anchor and surrounding the first, second, third, and fourth sides of the anchor to couple to the edge of the movable element, wherein the spring structure makes no more than one coil around the anchor to position the first attach point in proximity to the second attach point, and wherein the beam sections of the spring structure include:
- a first beam section having the first attach point coupled to the first side of the anchor;
- a second beam section coupled to the first beam section;
- a third beam section coupled to the second beam section and arranged substantially parallel to the first beam section, the third beam section residing adjacent to the second side of the anchor;
- a fourth beam section coupled to the third beam section and residing adjacent to the third side of the anchor; and
- a fifth beam section coupled to the fourth beam section and residing adjacent to the fourth side of the anchor, wherein the third beam section is characterized by a length that is greater than a discrete length of each of the first, second, fourth, and fifth beam sections, the length of the third beam section determining a spring constant of the spring structure.

10. The inertial sensor of claim 9 wherein the spring structure enables sense motion of the movable element in a first direction parallel to the surface of the substrate, and the first and second attach points are displaced away from one another in a second direction perpendicular to the first direction and parallel to the surface of the substrate.

11. The inertial sensor of claim 9 wherein the spring structure enables sense motion of the movable element in a first direction parallel to the surface of the substrate, the edge of the movable element is oriented perpendicular to the first side of the anchor, and the first attach point is displaced away from the second attach point in the first direction.

12. The inertial sensor of claim 9 wherein the spring structure enables sense motion of the movable element in a first direction parallel to the surface of the substrate, and a length of the third beam section is oriented in a second direction parallel to the surface of the substrate and perpendicular to the first direction.

* * * * *